United States Patent [19]
Minghetti

[11] Patent Number: 6,077,575
[45] Date of Patent: *Jun. 20, 2000

[54] SUSPENDING ACCENT PARTICLES IN AN ACRYLIC MATRIX

[75] Inventor: Ettore Minghetti, Boone County, Ky.

[73] Assignee: Aristech Acrylics LLC, Florence, Ky.

[*] Notice: This patent issued on a continued prosecution application filed under 37 CFR 1.53(d), and is subject to the twenty year patent term provisions of 35 U.S.C. 154(a)(2).

[21] Appl. No.: 08/861,040

[22] Filed: May 21, 1997

Related U.S. Application Data

[63] Continuation-in-part of application No. 08/620,511, Mar. 22, 1996, Pat. No. 5,747,154, which is a continuation-in-part of application No. 08/392,650, Feb. 23, 1995, Pat. No. 5,521,243, which is a continuation-in-part of application No. 08/157,253, Nov. 26, 1993, abandoned.

[51] Int. Cl.$^7$ ............................... C08K 3/00; C08K 5/00
[52] U.S. Cl. .................. 428/15; 428/35.7; 428/36.4; 428/220; 428/327; 523/171; 523/220
[58] Field of Search ................... 428/35.7, 34.5, 428/15, 220, 319.1, 318.4, 327, 36.4; 523/171, 573, 220; 524/437

[56] References Cited

U.S. PATENT DOCUMENTS

| | | | |
|---|---|---|---|
| 4,085,246 | 4/1978 | Buser et al. | 428/15 |
| 5,244,941 | 9/1993 | Bruckbauer et al. | 523/171 |
| 5,521,243 | 5/1996 | Minghetti et al. | 524/437 |
| 5,747,154 | 5/1998 | Minghetti et al. | 428/327 |

*Primary Examiner*—Rena L. Dye
*Attorney, Agent, or Firm*—Thorp Reed & Armstrong, LLP

[57] ABSTRACT

A method of making acrylic products having a relatively even distribution of visible accent particles dispersed therein. The acrylic products are made from a composition comprising an acrylic matrix comprising a monomer rich syrup and having pre-formed particles added thereto. The pre-formed particles are evenly dispersed in the matrix by virtue of their geometry, similarity in composition or specific gravity to that of the matrix. When added with the accent particles, the pre-formed particles serve the function of restricting the movement of, and thereby suspending the accent particles in an even dispersion within the matrix. The results is an even distribution of the accent particles in the finished product.

15 Claims, No Drawings

6,077,575

SUSPENDING ACCENT PARTICLES IN AN ACRYLIC MATRIX

RELATED APPLICATIONS

This application is a continuation-in-part of application, Ser. No. 620,511 filed Mar. 22, 1996 now U.S. Pat. No. 5,747,154 which is a continuation-in-part of Application Ser. No. 392,650 filed Feb. 23, 1995, now U.S. Pat. No. 5,521,243, which was a continuation-in-part of Application Ser. No. 157,253 filed Nov. 26, 1993, now abandoned.

TECHNICAL FIELD

This invention relates to a method of making acrylic products. The invention includes the use of a novel composition comprising an acrylic syrup having pre-formed particles dispersed therein. The composition also comprises accent particles which may have a dissimilar specific gravity than that of the matrix. Both types of particles remain evenly dispersed within the matrix before and after polymerization.

BACKGROUND OF THE INVENTION

Acrylic syrups have been widely used in the continuous and cell casting arts. For example, Hellsund in U.S. Pat. No. 3,337,383 and Opel in U.S. Pat. No. 3,376,371 disclose the continuous casting of wide sheets of acrylic between two stainless steel belts. Other methods of production of acrylic products are well known in the art, and include processes such as mold and cell casting operations.

The addition of pre-formed particles is also known in the art. For example, Minghetti et al. in U.S. Pat. No. 5,530,041 disclose a process of making an acrylic-filled thermoformable acrylic sheet. There, pre-formed acrylic particles or chips are mixed into an acrylic syrup rich in monomer. The pre-formed particles comprise crosslinked acrylic. When mixed into the syrup, the particles tend to swell with monomer to at least 200% of their original volume. After the particle-filled syrup is cast and cured, the matrix is continuous throughout the finished sheet. That is, the matrix passes through the particles. The particles become part of the matrix, rather than a separate part of the finished sheet. This is in contrast to fillers such as polyester resin chips or glass spheres, which will not absorb monomer, and thus remain a distinguishable part of the finished product.

The above references disclose particles which are added in an amount wherein they occupy a significant volume of the pre-polymerization mixture. However, due to the geometry of the particles, there remains significant space between the particles. The present invention incorporates accent particles into these spaces.

The addition of accent particles is similarly known in the prior art. These particles may be soluble, partially soluble, or non-soluble in the matrix. Both soluble and partially soluble particles may tend to swell with monomer when added to the matrix. However, soluble particles will dissolve when added to the syrup. Therefore, their presence or absence is not important in the context of the present invention. The present invention specifically incorporates those type accent particles that are either non-soluble or partially soluble, and which do not swell with monomer to an extent that the integrity of the particle is lost.

Most choices for accent particles will have a specific gravity that is dissimilar to that of the acrylic matrix. Additionally, these particles are typically added in low volumetric amounts, in contrast to the pre-formed particles. This contributes to the uneven dispersion encountered with prior art compositions.

When accent particles are added to the syrup, they tend to migrate from the even dispersion obtained by initial mixing. This situation may be exasperated by the changes in viscosity of the syrup that are known to occur during the temperature increases that precede the polymerization phase of the operation. Additionally, when a continuous casting operation such as that described by Hellsund and Opel et al, is utilized the vibration and turbulence caused by the stainless steel belts tend to increase the rate of migration of the particles.

The results of accent particle migration in the matrix are detrimental to the finished product. If the particles migrate to either the top or bottom side of the casting belt, the finished product will experience aesthetic, as well as physical deficiencies. For example, if the particles comprise a non-thermoformable composition such as metallized polyethylene glycol teraphalate (PET), as is commonly used in boat hulls, the resulting sheet will be difficult to thermoform. The particles will tend to sink toward the bottom surface, and pack into place. This will prevent sufficient amounts of the matrix from reaching the lower portion of the sheet. Additionally, the resulting sheet will likely distort upon cooling, and may be brittle and tend to crack easily.

The present invention incorporates the above concepts, and comprises an improvement over these concepts. The present invention incorporates the use of pre-formed particles into the acrylic matrix for a novel purpose. The addition of these particles creates what is in effect a network that restricts the movement of other particles added to the syrup. The result is unexpected in view of the prior art. The products of the present invention have a relatively even dispersion of accent particles throughout the finished product. These particles will be relatively evenly distributed even if they possess a specific gravity that is dissimilar than that of the acrylic matrix. Additionally, the orientation of these accent particles will tend to be random, rather than uniform, throughout the finished product. This is particularly advantageous when the accent particles used have an asymetric three dimensional geometry, such as flat particles.

SUMMARY OF THE INVENTION

The present invention is drawn to a method of suspending accent particles in an acrylic matrix having pre-formed particles dispersed therein, and the products produced therefrom. The particles will be relatively evenly dispersed within the acrylic matrix prior to and after polymerization.

In the context of the present invention, pre-formed particles typically refers to those type particles which have been used in acrylic sheet production. These particles have a three dimensional geometry which would allow them to occupy a significant volume, but leave voids in the space between the particles. This space will be sufficient to allow the accent particles, as defined below, to occupy that space.

The pre-formed particles may be acrylic in nature, such as those disclosed in U.S. Pat. No. 5,530,041. The preformed particles may also be non-acrylic. Glass spheres, ground poly vinyl chloride (PVC), or polyester resin particles, as are all common in the art, may be employed. The determination of the particles employed depends, to a large extent, on the desired end product. Crosslinked acrylic particles are particularly advantageous in thermoforming operations. For example, the particles disclosed in U.S. Pat. No. 5,530,041 are useful in that they are integrated with the matrix syrup upon polymerization. Clear particles may also be advantageously employed. This is especially true when the matrix and pre-formed particles have a similar composition. The effect is to create a pre-formed particle filled matrix wherein these particles are not easily distinguishable, if at all, to the observer.

The pre-formed particles occupy a significant weight and volume in the matrix. They are added in amounts of about 0.1 to about 80% based upon the total weight of the product. Volumetrically, the particles are about 0.1 to about 95% of the volume of the matrix at 20° C.

As used herein, accent particles refer to those types which do not occupy a significant volume when added to the matrix. Often, these particles have a flat three-dimensional geometry. These particles generally have a specific gravity different than that of the matrix, and as a result will tend to sink or float when added. The specific gravity of these particles will be about 1.0 to about 8.9 if particles heavier than the matrix are used, and about 0.1 to about 1.0 if lighter particles are used. Typically, these particles serve to create an aesthetically desirable appearance in the finished product. For example, as described above, PET film particles are widely used in making boat hull material.

The accent particles may be any one of the following general classes of particles typically employed in the art:

Pigments of all kinds, particularly the inorganic pigments, which are often too heavy to remain homogeneously suspended in liquid mixtures of medium to low viscosities. Iron and chromium oxides are particularly known for their tendency to settle.

Metallic particles or whiskers, most commonly based on aluminum and copper alloys. Aluminum flakes or glitter are available in many sizes and their sparkling effect in the finished product increases with their particle size. The copper alloys are generally brasses, from copper and zinc mixtures with small amounts of aluminum. Their color changes with the composition and may also be affected by the processing conditions and the oxidation of the surfaces. The longest dimension of these flakes can be as large as several millimeters.

Mica flakes-the mica particles, in their natural color or with colored surface, have a flat sheet-like geometry and can be as large as several millimeters.

Pearlescent pigments, which are generally made from mica and are coated with high refractive index layers and an absorption color layer, to provide additional reflective surfaces. Such a layered structure produces the pearlescent effect, by reflecting the incident light from the several parallel surfaces. If the appropriate thicknesses are used, iridescence will also be produced.

Glass microspheres, solid or hollow. Hollow microspheres may have a specific gravity as low as about 0.15 to about 0.38.

Fiber and fibrous materials, glass fibers and of other kinds may be useful for certain applications. Among them are polyester based fibers, carbon fibers, and aramid based fibers.

Metallized plastic particles are also quite suitable for use in this invention. They are prepared from PET films which are first metallized and then cut into particles. Their specific gravity of about 1.2–1.4 makes them heavier than many liquid monomeric mixtures and increases their tendency to settle, particularly when their size is larger than about 10 microns.

One object of the present invention is to provide a method for making acrylic products having, accent particles dispersed therein. Another object is to provide for the relatively even distribution of these particles within the matrix of the finished product.

Another object of the present invention is to provide for a matrix comprising an acrylic syrup and a network of pre-formed particles dispersed within the syrup. These pre-formed particles are relatively evenly distributed throughout the matrix. The pre-formed particles have sufficient space in between to allow for accent particles to be trapped therein. The pre-formed particles act as an impediment to the migration of the accent particles in the syrup.

A further object of the present invention is to provide for acrylic products having dispersed therein: (1) pre-formed crosslinked acrylic particles wherein the cured syrup matrix interpenetrates said particles creating a more or less uniform matrix through the particles; and (2) accent particles dispersed throughout the matrix of said product, wherein the movement of the accent particles has been restricted by the acrylic-particle filled matrix.

Yet another object of the present invention is to provide for an acrylic product comprising a clear acrylic matrix and having dispersed therein (1) clear pre-formed particles which are indistinguishable, or nearly indistinguishable from the acrylic matrix as visually observed in the final product, and (2) colored or metallic appearing particles dispersed within the matrix and visually distinguishable as observed in the final product.

As stated above, pre-formed particles are added to the matrix syrup. The specific source of the particles is not critical. The particles can be made by any method commonly known in the art. For instance, an acrylic monomer syrup may be cast into sheet form. The resulting sheet is then ground to the desired particle size. In some of the Examples that follow, the pre-formed acrylic particles were smaller than 35 mesh, or 500 microns.

DETAILED DESCRIPTION OF THE INVENTION

The acrylic matrix comprises a syrup comprising methyl methacrylate ("MMA"). MMA should comprise about 60 wt % or more of the syrup. Preferably, the syrup comprises 80–95 wt % MMA. Preferably, the syrup also comprise about 5 to about 30 wt % linear PMMA. The matrix may also comprise co-monomers such as butyl acrylate in amounts up to about 30 wt % of the syrup. Preferably, when copolymer is used, it is 2–20 wt % of the syrup. More preferably, it is 2–10 wt %, and most preferably, 3–5 wt %. Typically, the syrup will have a weight average molecular weight of about 50,000 to about 600,000.

The syrup may also comprise a crosslinking agent. Typically, the crosslinking agent, if added, comprises up to about 2 wt % of the syrup. Preferably, about 0.1 to about 1 wt % is used. In the most preferred embodiment when a crosslinking agent is used, the amount of crosslinking agent is such that the composition may be used to make a thermoformable product.

The syrup may also comprise dyes and pigments, as is commonly known in the art. However, it is of particular aesthetic advantage to use a clear syrup that when mixed with pre-formed particles which are also clear in color, produces a clear matrix wherein the acrylic particles are not visually noticeable.

In the preferred embodiment, the pre-formed particles comprise PMMA. Here too, the particles may also comprise up to about 30 wt % copolymer such as butyl acrylate. Preferably, if copolymer is used, it is butyl acrylate, and is about 2–20 wt % of the particles. More preferably, it is 2–10 wt %, and most preferably, 2–5 wt %. The particles are most preferably crosslinked. That is, a crosslinking agent is typically added to the pre-polymerized particle syrup. The particles may vary widely in the degree of crosslinking. By degree of crosslinking is meant the number of polymer chains having at least one crosslinking site. The degree of swelling is inversely related to the extent of crosslinking. By extent of crosslinking is meant the ratio of the number of crosslinking sites to one hundred polymer chains.

The preferred pre-formed particles swell when added to the matrix. The matrix monomers penetrate the pre-formed particles, and causes the observed swelling. Typically, when crosslinked acrylic particles are used, the particles swell from about two to twenty times their original volume. Therefore, the degree and extent of crosslinking may vary widely, but the combination of the two must be such that the pre-formed particles are flexible enough to allow the particle to swell to the desired volume, but rigid enough to hold their integrity in the syrup and the resulting products. If the crosslinking is insufficient, the particles will break apart and dissolve substantially in the syrup. If the crosslinking is too extensive, the particles will be too rigid, and will not absorb at least 50% of their original volume. Typically, the degree of swelling in the particles will be about 50 to 500% with a moderate extent of crosslinking. More preferably, the pre-formed particles absorb about 100–500% of their original volume of syrup. Most preferably, they absorb about 300–500%. Preferably, the final product comprises between about 0.1 and 80 wt %, based on the weight of the syrup, of the pre-formed crosslinked acrylic particles, and more preferably about 3 to about 35 wt %. These acrylic particles preferably comprise polymerized MMA. The MMA in the particles preferably comprises about 60 wt % or more of the pre-polymerized particle composition. Most preferably, the particles are prepared from a syrup comprising 80 wt % or more MMA. Here too, linear PMMA, co-monomers, additives, fillers, and pigments may be added to the pre-polymerized composition. Preferably, 5–30 wt % linear PMMA is used. A crosslinking agent is added to the pre-polymerized particle composition. The crosslinking agent is up to about 2 wt % of the pre-polymerized particle composition. Preferably, it is up to about 1 wt %, and most preferably it is about 0.1 to about 0.7 wt %, based on the weight of the monomers.

The pre-formed acrylic particles are a few microns to about five millimeters in size. Preferably, the acrylic particles are about 10 to about 500 microns in size. The particles may be colored or colorless. In combination with a clear matrix syrup, clear acrylic particles will be visually indistinguishable in the polymerized matrix.

The accent particles should be visible to the naked eye. Preferably, they are about 40 microns to about seven millimeters in mean size in the longest dimension. The accent particles may be colored, opaque, metallic in appearance, or possess some other visually discernible appearance. Preferably, the accent particles are PET. When used in combination with a clear matrix, the resulting product appear as a clear acrylic having the PET particles evenly dispersed therein.

These particles are about 40 microns to about seven millimeters in mean size (longest dimension). Preferably, the particles are about 60 to about 5000 microns in size, and most preferably are 60 to 3000 microns in size. In one embodiment, the particles are larger than the pre-formed particles, and are 3000–5000 microns in mean size.

The accent particles may have a specific gravity greater or less than that of the matrix. Preferably, the specific gravity of the non-acrylic particles is about 0.15 to about 8.9. More preferably, the particles are selected from materials having a specific gravity between about 1.0 and 3.0. These particles occupy up to about 80% volumetrically, based upon the volume of the matrix at 20° C. They are added in an amount of about 0.1 to about 80 wt % based upon the weight of the syrup. Preferably, they are about 3 to about 25 wt %.

In the present invention, the pre-formed acrylic particles are combined with the syrup and the accent particles. That composition is then polymerized in situ, or more preferably, as part of a continuous casting operation listed above. The resulting acrylic product may be re-processed if the polymerized composition is thermoformable. The preferred product is a thermoformable sheet.

The invention is illustrated, but not limited by the following examples.

EXAMPLE 1 AND 2

Clear ground particles were sifted through a 35 mesh sieve and were added under agitation to a mixture of acrylic syrup and MMA. The acrylic syrup was produced from partial polymerization of a monomeric mixture of methyl methacrylate and butyl acrylate (97 wt % and 3 wt % respectively) following a well known method practiced by the known art. The syrup viscosity was 3.0 Poise and had a polymer content of 20wt %. The clear ground matrix particles were obtained from a clear 1–3 brand sheet produced by Aristech Chemical Corporation, made from the syrup described above, which was polymerized in a Continuous Casting Machine, as described in U.S. Pat. No. 3,371,383 by O.H. Hellsund.

After about one hour from the addition of the pre-formed particles to the monomers, the accent particles to be kept evenly distributed in the final product were added. The suspension, kept under agitation since the beginning of this process, was deaerated under vacuum, after the additives and catalysts needed for a laboratory cell casting were also added. The liquid mixture was used to fill the cavity between two stainless steel cell casting plates, held about 5mm apart. The cell cast was sealed and it was immersed in 180° F. hot water, in a horizontal position, for 60 minutes. Finally, it was post cured in an air circulated oven at 250° F. for 30 minutes.

In Example 1, 2 phr of silver $\frac{1}{8}$" hexagonal accent particles, manufactured by Spectratek, were added before de-aeration. The silvery particles consisted of a metallized polyethylene therephtalate film, which is embossed by the manufacturer. The specific gravity of these particles is about 1.2, while that of the liquid matrix is about 1.0.

In Example 2, 2 phr of the same Spectratek accent particles of a smaller size ($\frac{1}{64}$") were used.

Both acrylic sheets showed a uniform and random distribution of the accent particles throughout the width, length and thickness of the sheet. The sheet of Example 1 showed very effectively how the large silvery particles were not oriented in a particular direction, but in all directions. The silvery particles were so well uniformly distributed in the sheet made from Example 1 and Example 2 that an observer could not distinguish between the top and the bottom of the sheet. This demonstrated that the accent particles were kept in a random distribution and orientation and that their settling was prevented.

COMPARATIVE EXAMPLE 3 AND 4

The same procedure described for Example 1 and 2 was followed for Comparative Examples 3 and 4 respectively, with the exception that no pre-formed particles were used.

Two phr of 1/8" Spectratek accent particles were used in Example 3 and 2 phr of the 1/64" Spectratek accent particles were used in Example 4. In both cases, the silvery particles were found in a layer about 0.2–0.3mm thick at the bottom surface of the cast sheet. The thickness of the sheets produced in Examples 1 through 4 was about 5mm.

EXAMPLE 5 AND 6

Example 5 was prepared using the same procedure of Example 1, except that the accent particles were 2.0 phr of Stoneware® mica, manufactured by Mearl, having particle sizes as large as 2×3mm. In the cast sheet, the flat mica particles were randomly oriented in all directions.

In Example 6, 2 phr of purple metallized Glitterex® accent particles were used. Their size was a square of about 0.5×0.5mm. In the cast sheets of Examples 5 and 6 the colored accent particles were found randomly dispersed in all directions and particularly in the vertical one, to the extent that an observer could not identify which were the top or the bottom surfaces.

COMPARATIVE EXAMPLE 7 AND 8

The same procedure described in Examples 1 and 2 was repeated for Comparative Examples 7 and 8 respectively, except that no pre-formed particles were used. In Example 7, 15 phr of the Stoneware mica used in Example 5 were added. The mica particles were found at the bottom surface of the cast sheet and were packed very tightly. Upon cooling to room temperature, the sheet lost its flatness and became warped.

In Example 8, the same 2 phr of purple Glitterex accent particles of Example 6 were used. All the purple particles settled at the bottom surface of the cast sheet, in a layer 0.2–0.3mm thick. The total sheet thickness was about 4.8mm.

EXAMPLE 9

Following the procedure of Example 1, the pre-formed particles were prepared from a Teal colored I3C sheet, produced by Aristech Chemical Corporation. The liquid matrix was not pigmented and 2 phr of Spectratek, 1/8" size, were used. The silvery accent particles were again evenly distributed and randomly oriented. A number of Spectratek particles were also visible below the surface in addition to those more clearly visible at the surfaces.

EXAMPLE 10

The same procedure of Example 1 was followed, with 2 phr of Spectratek 1/8" accent particles, except that the preformed particles were replaced with particles obtained by grinding a plasticized polyvinyl chloride(PVC) tubing, #93-A0181A-80, produced by Vytron Corporation®.

Short pieces of the PVC tubing were cooled in dry ice and processed through a lab grinder. Microscopic examinations revealed the particles to have a non-flat, rounded and elongated egg-like shape. Most of the particles, about 70% in number, had the longest dimension below 0.5mm, with a smaller amount, about 20% in number, of length and width between 0.5 and 1.0 mm and some of a larger size, about 10% in number, where length and/or width were higher than 1.0 mm and up to 2.0 mm. The acrylic sheet of Example 10 exhibited a uniform and random distribution of the silvery particles throughout the sheet. Some of the particles were laying at the surface and at different depths below either surface of the cast sheet.

What is claimed is:

1. A method of making a thermoformable acrylic composition comprising the steps of:

(a) providing a composition comprising:
        (i) a matrix comprising at least about 60 wt % methyl methacrylate,
        (ii) about 3 to about 25 wt %, based on the weight of said matrix, of a plurality of accent particles;
        iii about 3 to about 35 wt %, based on the weight of said matrix, of a plurality of transparent pre-formed crosslinked PMMA particles, with said transparent pre-formed crosslinked PMMA particles in said composition providing uniform distribution of said plurality of accent particles within said matrix by absorbing about 100 to about 500% based on said transparent pre-formed crosslinked PMMA particles' original volume of said methyl methacrylate; and (b) polymerizing said composition.

2. A method according to claim 1 wherein said matrix comprises about 80–95 wt % (methyl)methacrylate.

3. A method according to claim 2 wherein said matrix additionally comprises a co-monomer.

4. A method according to claim 3 wherein said co-monomer is butyl acrylate.

5. A method according to claim 1 wherein said transparent pre-formed crosslinked PMMA particles absorb 300–500% of their original volume.

6. A method according to claim 1 wherein said accent particles are selected from the group consisting of inorganic pigments, metallic particles, mica flakes, pearlescent pigments, glass microspheres, fiber or fibrous materials and metallized plastic particles.

7. A method according to claim 1 wherein said accent paricles comprise metallized PET.

8. A method according to claim 1 where in said transparent pre-formed crosslinked PMMA particles are about 10 to about 500 microns in mean size.

9. A method according to claim 1 wherein said transparent pre-formed crosslinked PMMA particles are about 10–500 microns in mean size.

10. A method according to clam 1 wherein said accent particles are about 40 microns to about 7 mm in mean size.

11. A method according to claim 1 wherein said accent particles are about 60 to about 5000 microns in mean size.

12. A method according to claim 1 wherein said accent particles are about 3000 to about 5000 microns in mean size.

13. A thermofortable composition comprising:

(a) a matrix comprising at least about 60 wt % of a syrup comprising (methyl)methacrylate;
    (b) about 3 to about 25 wt %, based on the weight of said matrix, of a plurality of accent particles having a mean particle size of about 40 to about 5000 microns in their longst dimension; and
    (c about 3 to about 35 wt %, based on the weight of said matrix, of a plurality of transparent pre-formed crosslinked PMMA particles having a mean size of about 10 to about 5000 microns in their longest dimension, with said transparent pre-formed crosslinked PMMA particles in said composition providing uniform distribution of said plurality of accent particles by absorbing about 100–500% based on said transparent pre-formed crosslinked PMMA particles' original volume, of said methyl(methacrylate).

14. A product made by polymerizing said composition of claim 13.

15. A sheet made by polymerizing the composition of claim 13.

* * * * *